United States Patent

[11] 3,588,494

[72] Inventor Pierre Mertens
 Uccle, Belgium
[21] Appl. No. 800,542
[22] Filed Feb. 19, 1969
[45] Patented June 28, 1971
[73] Assignee Ateliers De Constructions Electriques De
 Charleroi (ACEC), Societe Anonyme
 Charleroi, Belgium
[32] Priority Feb. 21, 1968
[33] Belgium
[31] PV.54,832

[54] PROCESS AND APPARATUS FOR MEASURING THE DISTANCE TRAVELLED BY A REMOTE CONTROLLED VEHICLE
8 Claims, 7 Drawing Figs.
[52] U.S. Cl.................................................. 246/63,
 246/122, 324/173, 340/47
[51] Int. Cl........................................................ B61l 21/00
[50] Field of Search............................................ 324/70, 34;
 235/92; 246/34, 187, 122, 194, 182, 63; 104/23
 (FS); 340/47, 48

[56] References Cited
UNITED STATES PATENTS
3,029,893 4/1962 Mountjoy.................... 246/194
3,327,111 6/1967 Frech............................ 246/122

Primary Examiner—Michael J. Lynch
Attorney—Raymond A. Robic

ABSTRACT: The disclosure relates to a process and an apparatus for measuring the distance travelled by a remote controlled vehicle. The apparatus includes a loop consisting of a cable placed along the path of the vehicle and having equidistant crossings in such a way as to invert, at these crossings, the phase of the signals fed to the cable, and means for detecting and counting these phase inversions to provide an indication of the distance travelled by the vehicle. It is further characterized by the fact that the cable is given, at different locations, a configuration producing, in the transmission to the vehicle, signals which are different from those produced by the crossings and forming marking points of a different type. The said signals are detected aboard the vehicle by a detecting apparatus which is not sensible to the regular crossings of the cable. These crossings are, on the other hand, detected by detecting means which are not sensible to the marking points. The number of marking points detected between two successive crossings of the cable is verified to find out if it lies between two predetermined limits corresponding respectively to the maximum and minimum number of marking points which may be found between two successive crossings depending on to the distance between such crossings.

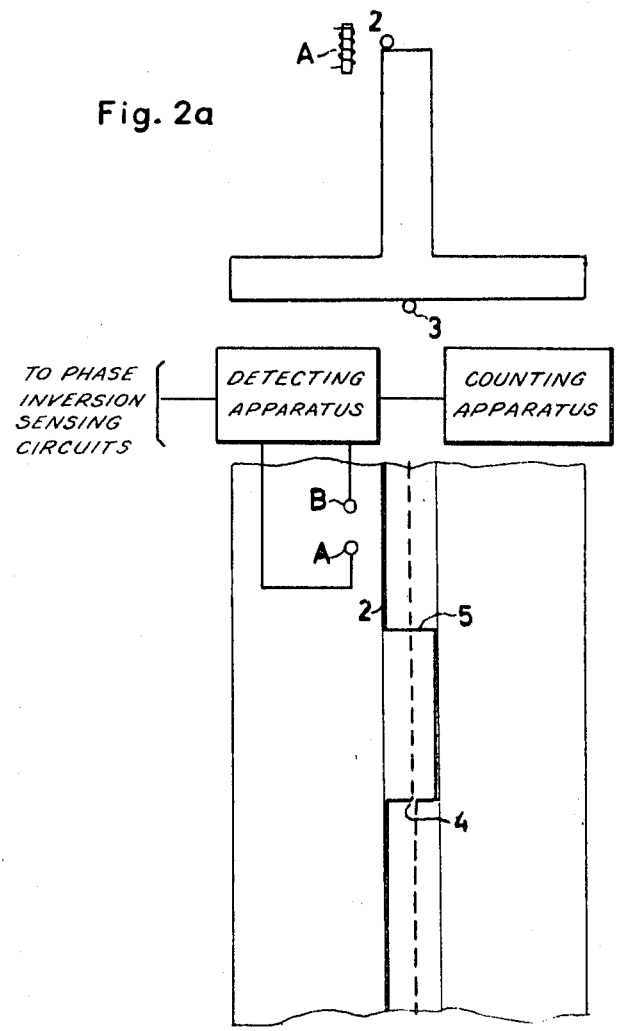

PROCESS AND APPARATUS FOR MEASURING THE DISTANCE TRAVELLED BY A REMOTE CONTROLLED VEHICLE

This invention relates to a process and apparatus for measuring the distance travelled by a remote controlled vehicle.

Various systems are known using a loop consisting of a cable placed along the path of a vehicle and having equidistant crossings in such a way as to invert, at these crossings, the phase of the signals fed from a fixed location to the cable and received by an antenna located on the vehicle. An appropriate detecting apparatus located aboard the vehicle permits to detect these phase inversions and to operate a counter whose reading provides a measure of the distance travelled from the beginning of the section defined by the loop. The above system may be completed by the addition of a tachometer but the measured distance is never reliable because, on one hand, a failure of the counter may happen and, on the other hand, in case of slipping, the indication obtained from the tachometer is untrue and nothing permits to detect one or the other of these errors. This drawback is particularly serious in the case of vehicles travelling at very high speeds such as monorail trains having an air-cushion suspension. In such cases, to prevent a collision with a downstream obstacle, the position of the train must be known at any moment and, if a failure occurs in the counting of the crossings, such failure must be signalled so that security measures may be applied immediately.

The present invention realizes this condition and is characterized in that between two successive crossings of the cable, such cable is given, at different locations, a configuration producing, in the transmission to the vehicle, signals which are different from those produced by the crossings and forming marking points of a different type. The said signals are detected aboard the vehicle by a detecting apparatus which is not sensible to the regular crossings of the cable. These crossings are, on the other hand, detected by detecting means which are not sensible to the marking points. The number of marking points detected between two successive crossings of the cable is verified to find out if it lies between two predetermined limits corresponding respectively to the maximum and minimum number of marking points which may be found between two successive crossings depending on to the distance between such crossings.

The invention will now be disclosed with reference to the drawings illustrating, by way of examples, preferred embodiments of the invention. In the drawings:

FIGS. 2a and 2b illustrate, in section and in a plan view respectively, the location of a cable and two antennas with respect to a monorail and their connection to the apparatus aboard the vehicle;

Figure 1:
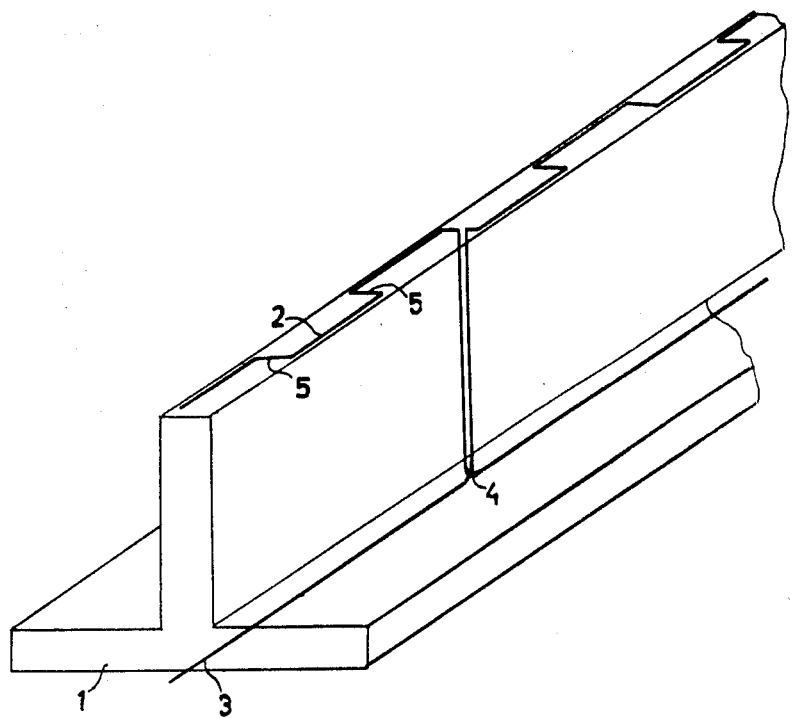
FIG. 1 illustrates a monorail used by a train having an air-cushion suspension and equipped with a transmission cable in accordance with the invention.

FIG. 1 illustrates a monorail 1 used as the railway of a train having an air-cushion suspension. On the top of the rail is positioned the active portion 2 of the transmission cable which is looped by a portion 3 located at the lower portion of the inverted T formed by the monorail. At regular intervals, the active portion of the cable meets the lower portion thereof by crossings 4, these crossings occurring, for example, every 100 meters. In addition, this active portion has a configuration as illustrated in FIG. 1. At point 5 the cable runs alternatively from the left side of the monorail to the right side thereof and vice versa. By using, on the vehicle, two antennas located one after the other in the direction of the movement of the vehicle and laterally with respect to the railway, the discontinuities of transmission occurring at the crossings of the cable are not sensed, and because the coupling of the antennas with the useful portion of the cable is different as the cable is positioned on the right or on the left side of the monorail, the variation of amplitude of the signals at the passage of each marking point may be detected and counted. The inversions of phase at the passage of each crossing of the cable may, on the other hand, be detected by other detecting circuits. If it is assumed that all the crossings are equally disposed and that between two successive crossings there are 10 marking points of the second type, it is easy to control if, between two successive registrations of crossings, there are 10 registrations of marking points in which case the measure of the distance travelled is correct. If such is not the case, the release of the security measures is initiated. It is to be noted that the number of marking points must be different from the number of crossings because interferences could occur which would cause confusion between the two types of discontinuities. In other words, it is necessary that between two crossings there be more than one marking point. It is not however necessary that the distances between successive crossings be equal, which means that between two crossings the number of marking points may vary but the upper and lower limits of such variations must be fixed and it must be established as a rule that, between two successive crossings, the number of marking points must not exceed these limits.

FIGS. 2a and 2b illustrate, in section and in a plan view respectively the location of the cable and of two antennas A and B with respect to the monorail. These antennas are connected to a suitable detecting apparatus.

Figures 3A, 3B:
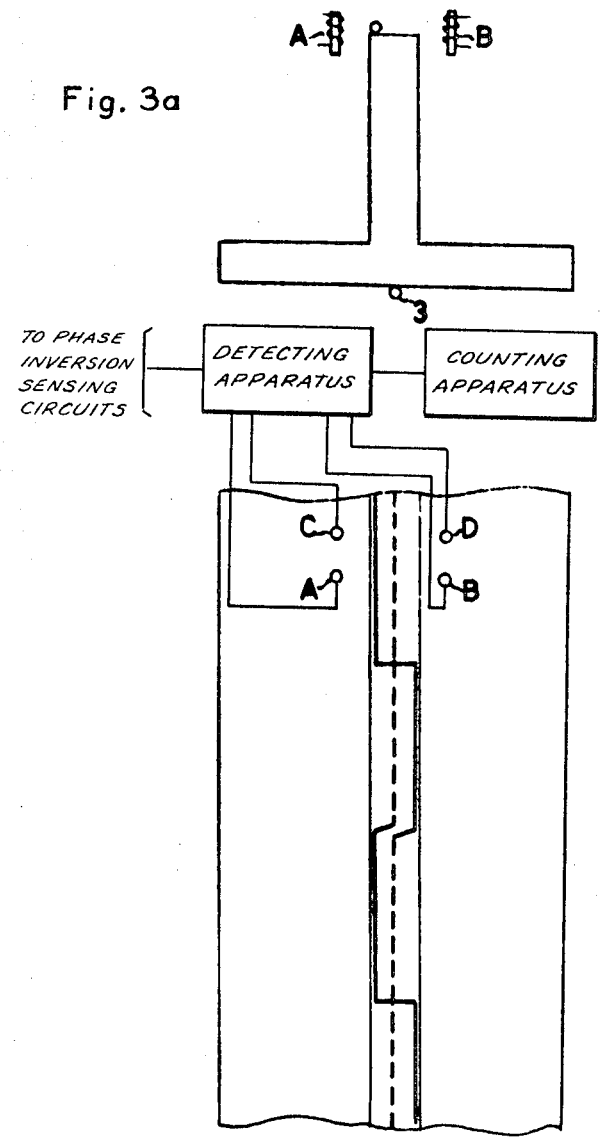
FIGS. 3a and 3b illustrate, in section and in a plan view respectively, the location of a cable and four antennas with respect to a monorail and their connection to the apparatus aboard the vehicle.

Instead of two antennas, four antennas may be used on the vehicle and disposed with respect to the cable as indicated in FIGS. 3a and 3b. In these FIGS. the antennas are designated by references A, B, C and D and it may be established that the respective electromotive forces which are generated by the cable $v_A$, $v_B$, $v_C$ and $v_D$ are such that, at the passage of the crossings, the sums of $v_A + v_B$ and $v_C + v_D$ have between themselves a phase difference of 180°, and that, on the other hand, at the passage of a marking point of the second type, it is the differences $v_A - v_B$ and $v_C - v_D$ which have between themselves a phase difference of 180°. The detection of these phase differences is performed aboard the vehicle by an apparatus of any convenient type.

However, at the passage of a crossing, there is a risk of counting erroneously a marking point as it may be verified by a thorough study of the phenomenons involved. To overcome this drawback, the counting of the marking points may be neutralized when a pair of antennas is in the neighborhood of a crossing, for example, when $$||v_A + v_B|| < 1/3 \ | V_C + V_D |$$

or when $$| v_C + v_D | < 1/3 | V_A + V_B |$$

Figure 4:
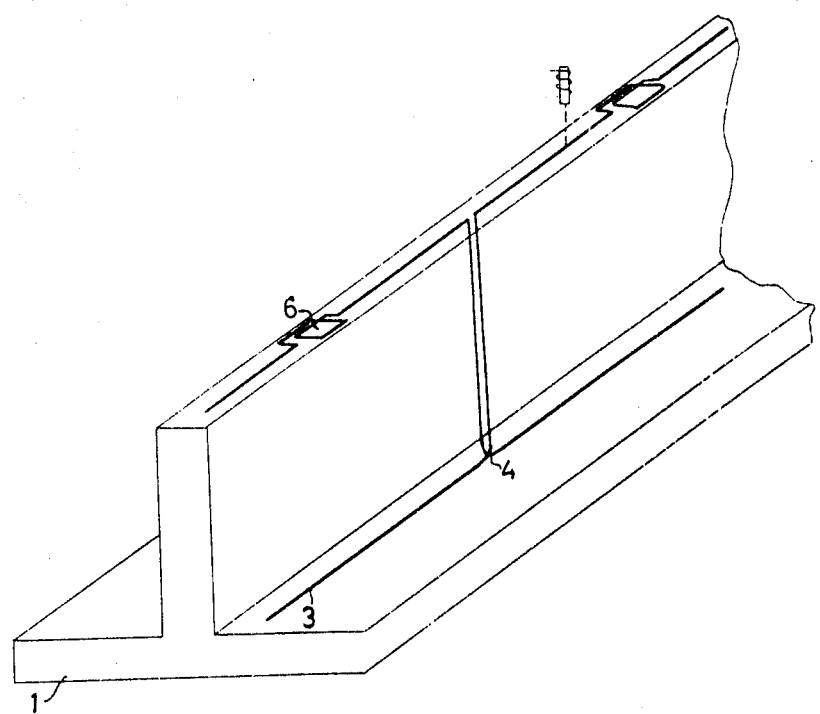
FIG. 4 illustrates a second embodiment of a cable configuration in accordance with the invention.
Figure 5:
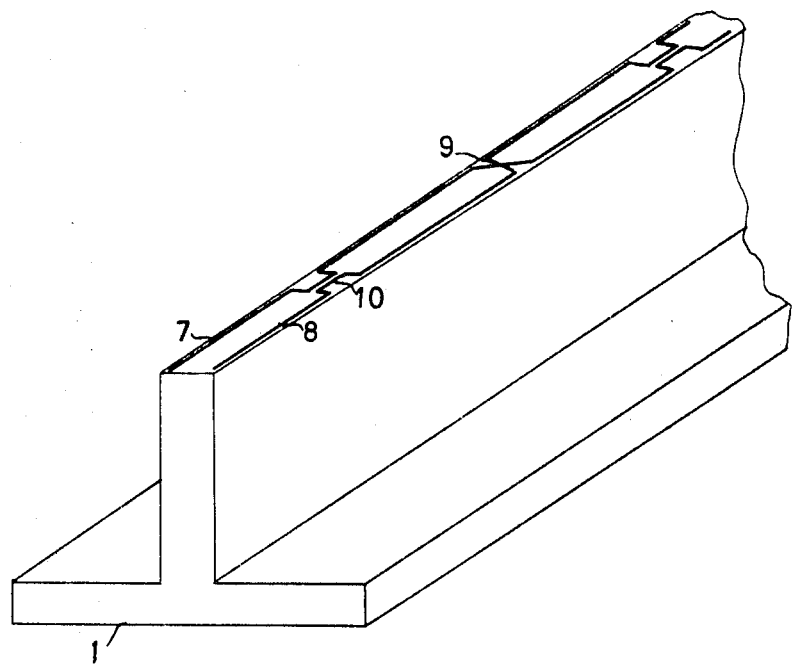
FIG. 5 illustrates a further embodiment of a cable configuration in accordance with the invention.

Marking points may obviously be obtained in a manner which is different from that shown in FIGS. 1 to 3. FIGS. 4 and 5 illustrate two other possible configurations. According to FIG. 4, the marking points consist of spirals 6 formed in the cable. By using a ferrite antenna mounted vertically above the cable, such antenna will pick up a signal only at the location of the spiral in question.

FIG. 5 illustrates another type of marking points. Here, the two sides 7 ad 8 of the cable having crossing 9 are disposed side by side on the upper portion of the inverted T portion of the monorail. The marking points 10 are realized by locally bringing closer together the two conductors 7 and 8 in such a way as to produce, at the predetermined locations, a decrease of the transmission signal. The marking points may be obtained by various other ways.

It is well known that the means for detecting and counting as well as the other apparatus installed aboard the vehicle are of the type known in the art.

I claim:

1. A process for continuously measuring the distance travelled by a vehicle having a telecommunication system with a central station, comprising the steps of:
   a. placing a loop consisting of a cable along the path of the vehicle, said loop being fed from the central station by modulated carrier currents and having periodical inversions of the two sides thereof forming crossings at various locations along the path thereof so as to successively invert at these locations the phase of the magnetic field of the cable;
   b. detecting aboard the vehicle first effects caused upon the transmission by said phase inversions and counting said first effects to provide an indication of the distance travelled;
   c. forming in said cable at various locations between two successive crossings a number of configurations called marking points causing in the transmission aboard the vehicle second effects which are different from those caused by the crossings;
   d. detecting aboard the vehicle said second effects and counting said second effects to provide an indication of the number of marking points in each succeeding interval between crossings; and
   e. constantly verifying that said number of marking points lies between two limits corresponding to the predetermined maximum and minimum number of marking points which may be found between two successive crossings.

2. A device for continuously measuring the distance traveled by a vehicle having a telecommunication system with a central station, comprising:
   a. a loop consisting of a cable placed along the path of the vehicle and having periodical inversions of the two sides thereof forming crossings at various locations along the path thereof forming crossings at various locations along the path thereof so as to invert, at these locations, the phase of the magnetic field of the cable, said cable being fed from a central station by modulated carrier currents supplied by a conventional generator;
   b. first detecting means located aboard the vehicle for successively detecting first effects in the transmission to the vehicle caused by said phase inversions and first counting means responsive to said first detecting means for counting said first effects to provide an indication of the distance travelled by the vehicle;
   c. said cable having between any two successive crossings a number of configurations producing in the transmission to the vehicle second effects which are different from those caused by the crossings and so providing marking points of a different type;
   d. second detecting means located aboard the vehicle for successively detecting said second effects and second counting means responsive to said second detecting means for counting said second effects in each succeeding interval between crossings, said second detecting means being not sensible to said crossings and said first detecting means being not sensible to said marking points;
   e. whereby it may be constantly verified that the number of marking points counted by said second counting means between two any successive crossings are located between two predetermined limits corresponding to the maximum and minimum number of marking points which may be found between two successive crossings.

3. A device as defined in claim 2, used in a railway vehicle running on a monorail, wherein the cable comprises an active portion coupled with the second detecting means of the vehicle and disposed at the upper portion of the monorail having an inverted T cross section, and a portion located at the lower part thereof, said active portion being interrupted at various locations and connected to the lower portion at said crossings.

4. A device as defined in claim 3, wherein the active portion of the cable has a saw-toothed shape.

5. A device as defined in claim 3, wherein said second detecting means includes sensing means consisting of two antennas disposed laterally with respect to the monorail one after the other in the direction of the monorail.

6. A device as claimed in claim 2, further comprising means for suspending the detection of the marking points in the neighborhood of a crossing.

7. A device as defined in claim 3, wherein the active portion of the cable is placed in the axis of the monorail and wherein the marking points are obtained by giving said active portion of the cable the form of spirals.

8. A device as defined in claim 2, used in a railway vehicle running on a monorail, wherein the full loop of the cable is active and placed symmetrically on the upper portion of the monorail, and wherein between two crossings, the two conductors forming the loop are, at various locations along the monorail, brought closer together to form the marking points.